April 17, 1951     R. L. DALTON     2,549,670
CAMERA BACK

Filed Aug. 17, 1949     4 Sheets—Sheet 1

INVENTOR.
ROBERT L. DALTON
BY Bishbringer
Attorney

April 17, 1951            R. L. DALTON            2,549,670
CAMERA BACK
Filed Aug. 17, 1949                                          4 Sheets-Sheet 2
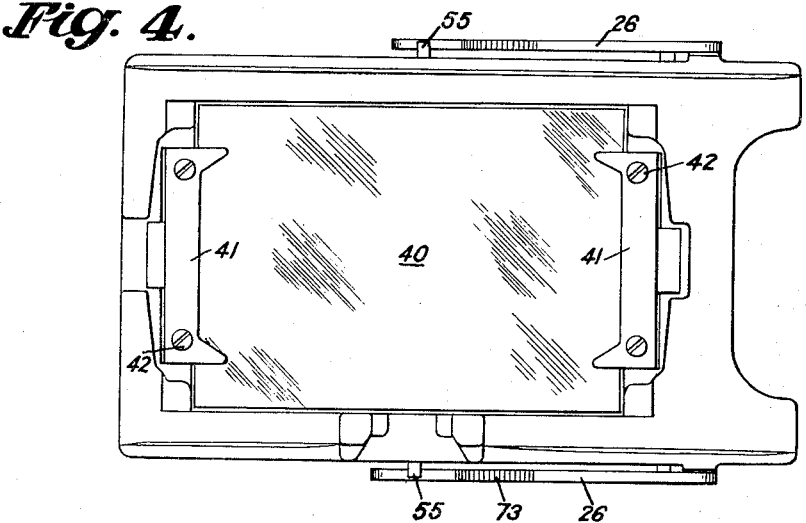
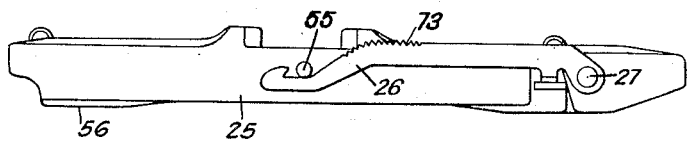
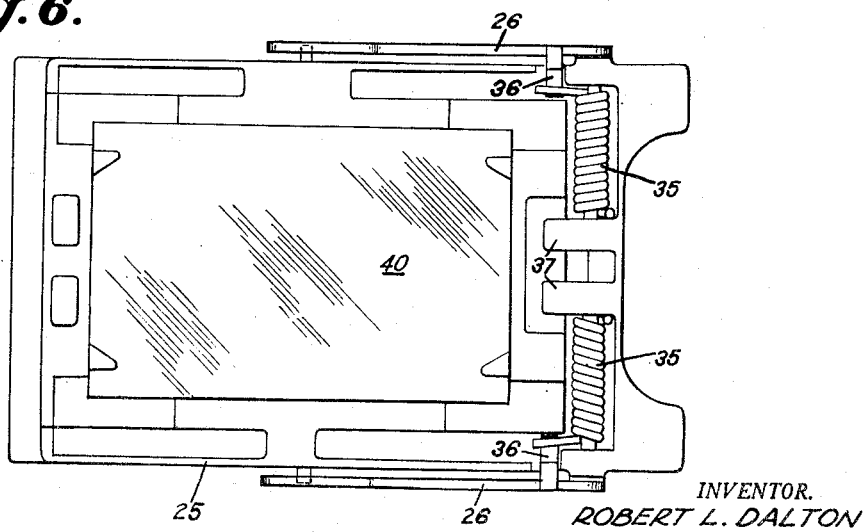
INVENTOR.
ROBERT L. DALTON
BY
Attorney April 17, 1951  R. L. DALTON  2,549,670
CAMERA BACK Filed Aug. 17, 1949  4 Sheets-Sheet 3

INVENTOR.
ROBERT L. DALTON
BY
Attorney

April 17, 1951 R. L. DALTON 2,549,670
CAMERA BACK

Filed Aug. 17, 1949 4 Sheets-Sheet 4

INVENTOR.
ROBERT L. DALTON
BY
Attorney

Patented Apr. 17, 1951

2,549,670

UNITED STATES PATENT OFFICE 2,549,670

CAMERA BACK

Robert L. Dalton, Irondequoit, N. Y., assignor to Graflex, Inc., Rochester, N. Y., a corporation of Delaware Application August 17, 1949, Serial No. 110,784

4 Claims. (Cl. 95—49)

The present invention relates to photographic cameras, and more particularly to the back structure of photographic cameras. In a still more specific aspect, the invention relates to a camera which has a focusing panel, that is movable away from the back of the camera to permit insertion between the back and the focusing panel of a sensitized material holder.

Various types of cameras are known in which the focusing panel is so connected to the back of the camera that it can be moved away from the back, after the camera has been focused, to permit insertion between the panel and the back of a film pack adapter, a cut-film magazine, or the like. In these cameras, the focusing panel is pivotally connected to the camera back and is held against the back under spring pressure; and, when the sensitized material holder is inserted between the focusing panel and the back, the spring tension on the panel is what clamps the holder in place. No other clamping means can be provided because the arms, by which the focusing panel is connected to the back, interfere.

The clamping pressure, which can be exerted on the sensitized holder by spring tension, is not always sufficient, however, to prevent movement of a film pack adapter when tearing off the tabs of the film pack, or to prevent movement of the cut-film magazine when shifting the film. Hence, unsatisfactory pictures may result. When three-color separations are being made, there is additional risk that the camera may be moved, for in making such pictures in conventional cameras the several sensitized material holders must be pushed into place between the focusing panel and the back one after another.

A conventional camera with a movable focusing panel cannot be used, moreover, with a conventional roll film holder because the standard roll film holder is too thick to fit between the focusing panel and the camera back. Separate cameras have had to be employed heretofore, therefore, for roll film holders.

One object of the present invention is to provide a camera with a focusing panel that is movable for insertion of a film-pack adapter, a cut film magazine, or the like, but in which the sensitized material holder may be held more firmly and more securely than in the conventional cameras of this type.

Another object of this invention is to provide a camera in which the focusing panel is detachably connected to the camera back so that, after the camera has been focused, the focusing panel may be removed for three color separation work, or for mounting of a roll film holder.

A further object of the invention is to provide a camera with a focusing panel which is quickly detachable therefrom and quickly attachable thereto.

Another object of the invention is to provide a camera with a multi-purpose back which will take all types of sensitized material holders.

Still another object of the invention is to provide a camera having means for more firmly securing in place any type of sensitized material holder.

Other objects of the invention will be apparent hereinafter from the specification and from the recital of the appended claims.

In the drawings:

Fig. 4 is a rear view showing the focusing panel removed from the camera back with the door off the panel;

Fig. 5 is a side elevation of the parts shown in Fig. 4;

Fig. 6 is a front elevational view, looking at the opposite side of the focusing panel from Fig. 4;

Figure 1:
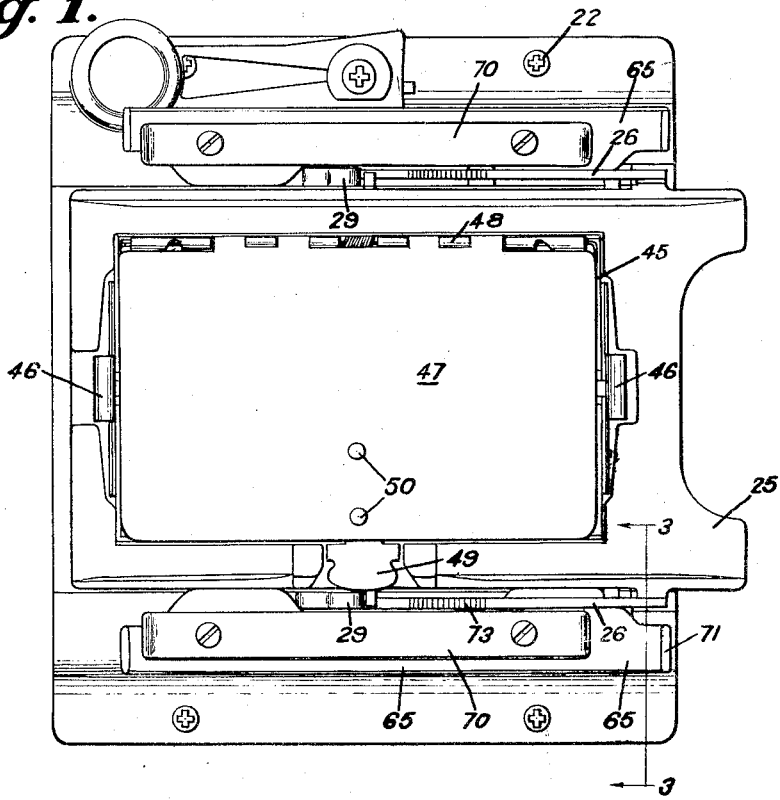
Fig. 1 is a rear elevational view of the back of a camera made according to one embodiment of this invention.

Referring now to the drawings by numerals of reference, 20 denotes generally the improved camera back of the present invention. This back may be secured to the camera box, shown at 21 in Fig. 10, by screws 22. Removably mounted in a centrally disposed recess or well in the back 20 is the focusing panel 25. This panel is adapted to be detachably secured to the back 20 by means of arms 26, each of which is pivotally connected at one end to the focusing panel at opposite sides thereof, respectively, by means of a shaft 27 that is journaled in the focusing panel. The arms 26 terminate in hooked portions 28 at their free ends which are adapted to engage hooklike members 29 that are fastened to the camera back by rivets 30. The hooks 29 are shaped so that the hooked portions 28 of arms 26 can rock thereon as the focusing panel is swung away from the camera back or toward the back in the movement between the positions of Figs. 2 and 8.

Mounted upon the shafts 27 are tension springs 35 (Fig. 3) which constantly urge the arms 26 in a clockwise direction. One end of each spring 35 abuts against a lug 36 (Fig. 2) formed on the related arm 26; and the opposite end of each spring seats against a lug 37 provided on the panel 25. The tension arms 26 are prevented from turning in a clockwise direction when the focusing panel is removed from the camera back by stop-pins 55 (Figs. 4 and 5).

The structure of the focusing panel itself, aside from the tensioning arms 26 and the parts which cooperate therewith, forms no part of the present invention. It comprises a casting having a recess therein in which is mounted a ground glass focusing screen 40 that is held in position on the focusing panel by means of clips 41 (Fig. 4). These are secured to the casting by means of screws 42. Mounted on the focusing panel behind the ground glass 40 is a focusing hood, not shown in detail but indicated generally at 45 in Fig. 1. The hood is secured in a well in the focusing panel by spring latches 46 which engage opposite sides of the hood. The hood is held normally in collapsed position by a door 47 which is hingedly connected at one side to the panel by means of a spring-actuated hinge 48. A latch 49, which is secured by means of rivets 50 to the door, serves to hold it closed. When the latch member is depressed, the focusing hood automatically springs into open position for viewing the image on the ground glass.

After the photographer has focused his camera, he collapses the focusing hood and closes and latches the door 47. Then he may move the focusing panel away from the camera-back for insertion of a film-pack adapter or of a cut-film magazine between the panel and back, or he may remove the focusing panel entirely from the camera and secure in its place either of these types of sensitizer material holders or another type of sensitized material holder as will be described further hereinafter.

To insert a film-pack adapter or a cut-film magazine between the panel and back, the photographer simply grasps the panel at opposite sides, moves the panel away from the back, and shoves the particular sensitized material holder in between the panel and back. The sensitized material holder then occupies the space previously occupied by the focusing panel, and the sensitized material which is to be exposed will then be in the same plane as the ground glass 40 was when the focusing panel was in its forward, focusing position.

Figure 7:
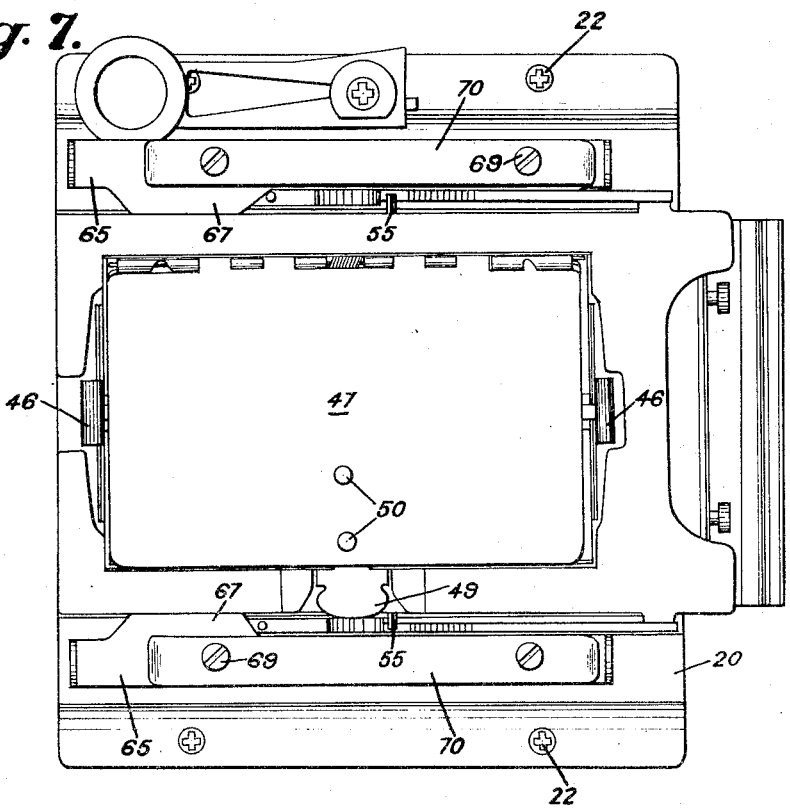
Fig. 7 is a rear elevation similar to Fig. 1 but showing a film pack adapter inserted in place between the focusing panel and the camera back.
Figure 8:
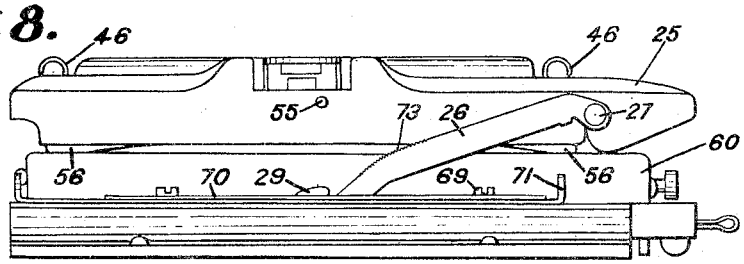
Fig. 8 is a side elevational view of the parts shown in Fig. 7.
Figure 9:
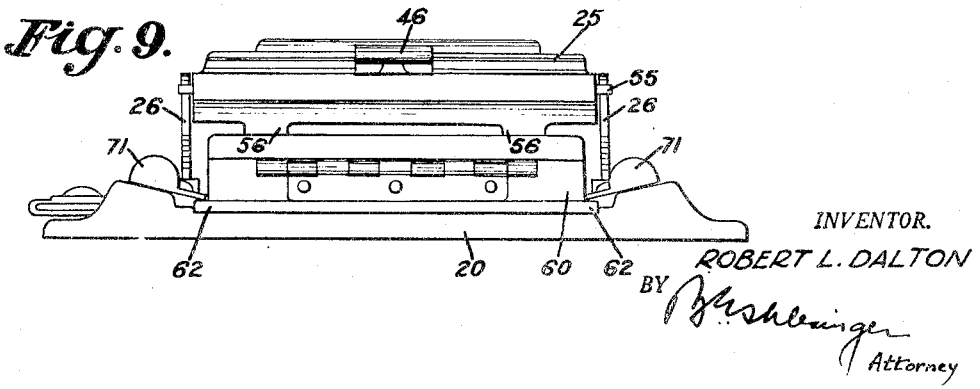
Fig. 9 is an end view looking at the left-hand end of Fig. 8.

Figs. 7, 8 and 9 show the focusing panel 25 moved away from the camera back 20 and show a film pack adapter 60 inserted between the camera back 20 and the focusing panel 25. The focusing panel 25 is provided with feet 56 on its front face, one at each corner. These feet are adapted to engage the sensitized material holder when the holder is in place; and the tension of the springs 35 applied through the arms 26 and the hooks 29 will hold the film-pack adapter firmly seated in the well or recess of the camera back which was formerly occupied by the focusing panel.

The film-pack adapter might be held in position by spring pressure alone, but to prevent any possible movement of the film-pack adapter when tearing off the tabs of the film pack, I have provided in my camera additional clamping means to securely hold the film-pack adapter against movement relative to the back 20. This additional clamping means comprises a pair of slide-locks 65.

Figure 11:
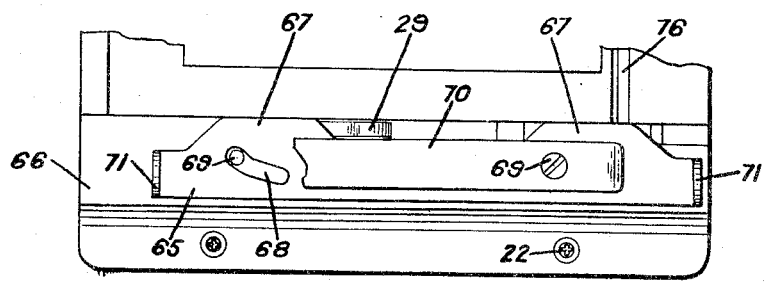
Fig. 11 is a fragmentary rear elevation of the camera back with the focusing panel removed, part of the lock spring being broken away to show more clearly the structure of one of the slide locks.

The back 20 is formed with parallel, longitudinally disposed side walls 64 (Fig. 3) that bound the recess or well in which the focusing panel normally rests. The rear faces 66 of these side walls are inclined from their outsides forwardly of the camera, the walls 64 being of least height adjacent the recess in the back of the camera and increasing in height away from the recess. The slide-locks 65 are mounted to slide on the faces or rails 66. Leaf springs 70 are provided for each slide-lock to exert a resilient pressure on the same. These springs 70 are secured to the camera back by screws 69 which thread into the walls 64 and pass through the springs 70 and cam slots 68 (Fig. 11) in the slide-locks. Each slide-lock has two longitudinally-spaced locking projections 67 formed thereon. Film pack adapters and cut-film magazines are conventionally provided with ribs or tonques, such as shown at 62 in Fig. 9. When the slide-lock 65 is moved to the left from the position shown in Fig. 11, then, it is caused to move over the rib 62 of the sensitized film-holder to clamp that rib against the camera back. Similarly the other slide-lock can be moved to engage the opposite rib 62, and between them the slide-locks rigidly clamp the holder 60 to the camera. The ends of the slide-lock members are turned up as denoted at 71 to provide flanges for moving them easily longitudinally.

The springs 70 exert downward pressure on the slide-locks. Because of the inclined faces 66 and the springs 70, the ribs 62 of the sensitized material holder can vary considerably in thickness, but the slide-locks will still clamp them securely.

When the thickness of the sensitized material holder is so great that the focusing panel cannot be moved far enough away from the camera back to permit insertion of the holder between the focusing panel and the back, or when for any other reason it is desirable to have the focusing panel out of the way, the focusing panel can be removed from the camera back and the sensitized material holder can be secured directly to the camera back. To remove the focusing panel from the camera back, the knurled portions 73 of the arms are pressed to disengage the hook-like ends 28 of the arms from the hooks 29. The focusing panel can then be slid to the right, as viewed in Figs. 1 and 2, until the hook portions 28 of the arms clear the hooks 29.

Figure 10:
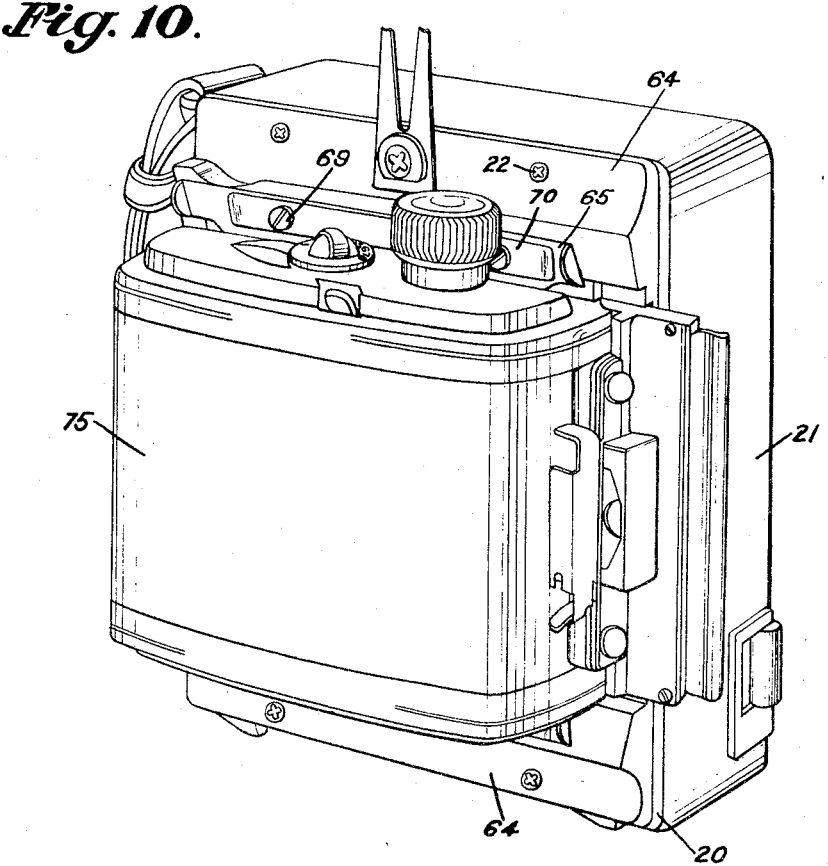
Fig. 10 is an isometric rear view of a camera made according to the present invention with the focusing panel removed and with a roll film holder secured to the back thereof.

In Fig. 10, the focusing panel is shown removed from the camera back; and in its place there is mounted a roll film holder 75. The holder shown is a holder such as disclosed in the pending U. S. patent application of Clarence E. Smith, Serial No. 106,628, filed July 25, 1949, but the holder might be of any conventional construction. The roll holder 75 is clamped to the camera back by means of the slide-locks 65.

If it is desirable to use the focusing panel between exposures, it is a simple matter to disengage the slide-locks 65 and remove the roll film holder 75 from the camera and slip into its place the focusing panel to permit focusing the camera and to then remove the focusing panel and again put the roll holder in place. The back 20 of the camera is provided with a notch or groove 76 (Fig. 11) to receive the key which is provided on all sensitized film holders to prevent light from leaking past the sensitized material holder. Instead of a groove, however, a key might be provided on the camera back and complementary grooves might be provided on the sensitized material holders.

Figure 2:
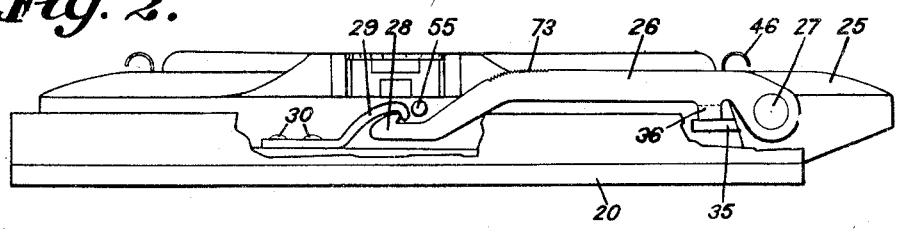
Fig. 2 is a side elevation of the camera back, certain parts being broken away to show the construction more clearly.
Figure 3:
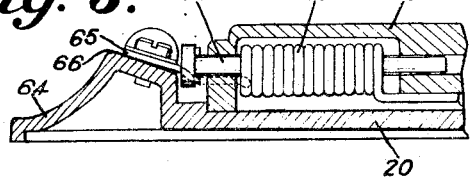
Fig. 3 is a section on the line 3—3 of Fig. 1 looking in the direction of the arrows.

As is shown clearly in Figs. 1 and 2, the main portions of the arms 26 lie parallel to but slightly above the rails 66. This allows ample room for the slide-locks 65 and their projections 67. With my construction, then, the tension arms do not interfere with the operation of the slide-locks or vice versa. Thus I have been able to provide a multi-purpose camera back which will take all conventional types of sensitized material holders, enabling one camera to be used with various forms of film.

While the invention has been described in connection with a particular embodiment thereof, it is capable of further modification, and this application is intended to cover any variations, uses, or adaptations of the invention following, in general, the principles of the invention and including such departures from the present disclosure as come within known or customary practice in the art to which the invention pertains and as may be applied to the essential features hereinbefore set forth and as fall within the scope of the invention or the limits of the appended claims.

Having thus described my invention, what I claim is:

1. In combination, a camera back, a focusing panel, said camera back having a recess therein to receive said focusing panel or a sensitized material holder and having parallel walls at opposite sides of said recess which extend longitudinally of the recess and bound said recess, said walls having rear faces that are inclined inwardly toward the bottom of the recess from the outsides of the walls and that converge toward the bottom of the recess, cooperating members on the panel and back for detachably connecting the focusing panel to the back and permitting the panel to be moved away from the back to allow a sensitized material holder to be inserted between the panel and the back, spring means for effecting tension between the cooperating members, when the panel is moved away from the back, to clamp the material holder to the back under spring pressure, lock members mounted on the rear faces of said walls for longitudinal sliding movement thereon, and cooperating pins and cam slots on said lock members and rear faces for moving the lock members toward one another and inwardly toward the bottom of the recess, as they are moved longitudinally in one direction, thereby to clamp a sensitized material holder positively to the back.

2. In combination, a movable focusing panel, a camera back having a recess therein to receive said focusing panel and having parallel walls which extend longitudinally along opposite sides of said recess and which project rearwardly beyond the bottom of said recess and bound said recess, a pair of hooks secured to said back at opposite sides of said recess between said parallel walls, said hooks being laterally aligned and having their hooked portions facing forwardly, a pair of arms pivotally connected to the focusing panel at opposite sides thereof, said arms being laterally aligned and each terminating in a rearwardly facing hooked portion which is adapted to engage detachably one of the hooks of the back, tensioning means for urging said arms in one direction about their pivots into hook-engaging position, and means for limiting movement of said arms in said one direction, the hooked portions of the arms being pivotal in said hooks to permit the panel to be moved away from the back to allow a holder for sensitized material to be inserted between the panel and the back, and a slide lock reciprocably mounted on the rear face of each of said walls for longitudinal movement thereon, each slide lock having a cam slot therein, and a pin secured in each said wall and engaging in each cam slot, said cam slots being shaped to move the slide locks inwardly over the recess, when the slide locks are moved longitudinally in one direction, to clamp the sensitized material holder to the back.

3. In combination, a camera back having a recess therein and having parallel walls which extend longitudinally at opposite sides of the recess and bound said recess, each of said walls having a rear face which is inclined from the outside of the wall inwardly toward the bottom of the recess, a slide lock reciprocably mounted on each of said rear faces for longitudinal movement thereon, each of said slide locks having a cam slot therein, and a pin in the back engaging in each slot, said cam slots being shaped to move the slide locks inwardly toward one another when they are moved longitudinally in one direction on the rear faces of the walls.

4. In combination, a movable focusing panel, a camera back having a recess therein to receive said focusing panel and having parallel walls which extend longitudinally at opposite sides of the recess, each of said walls having a rear face which is inclined from the outside of the wall inwardly toward the bottom of the recess, a pair of hooks secured to said back at opposite sides of said recess in the bottom of the recess, said hooks being laterally aligned and having their hooked portions facing forwardly, a pair of arms pivotally connected to the focusing panel at opposite sides thereof, said arms being laterally aligned and each terminating in a rearwardly-facing hooked portion which is adapted to engage detachably one of the hooks of the back, tensioning means for urging said arms in one direction about their pivots into hook-engaging position, means for limiting movement of said arms in said one direction, the hooked portions of said arms being pivotal in said hooks to permit the panel to be moved away from the back to allow a holder for sensitized material to be inserted between the camera and the back, a slide lock reciprocably mounted on the rear face of each wall for longitudinal movement thereon, each of said slide locks having a cam slot therein, and a pin in the back engaging each cam slot, said cam slots being shaped to move the slide locks inwardly toward one another when they are moved longitudinally in one direction, thereby to clamp the sensitized material holder positively to the back.

ROBERT L. DALTON.

REFERENCES CITED

The following references are of record in the file of this patent:

UNITED STATES PATENTS

| Number | Name | Date |
|---|---|---|
| 713,596 | Brownell | Nov. 18, 1902 |
| 749,738 | Locke | Jan. 19, 1904 |
| 1,060,748 | Folmer | May 6, 1913 |

FOREIGN PATENTS

| Number | Country | Date |
|---|---|---|
| 511,164 | France | Sept. 20, 1920 |